Figure 4:
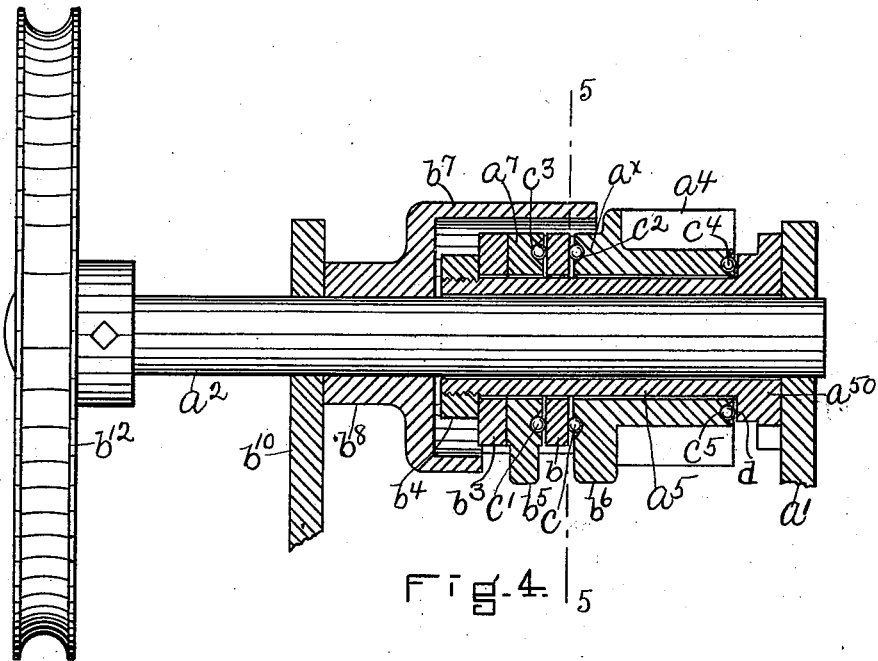

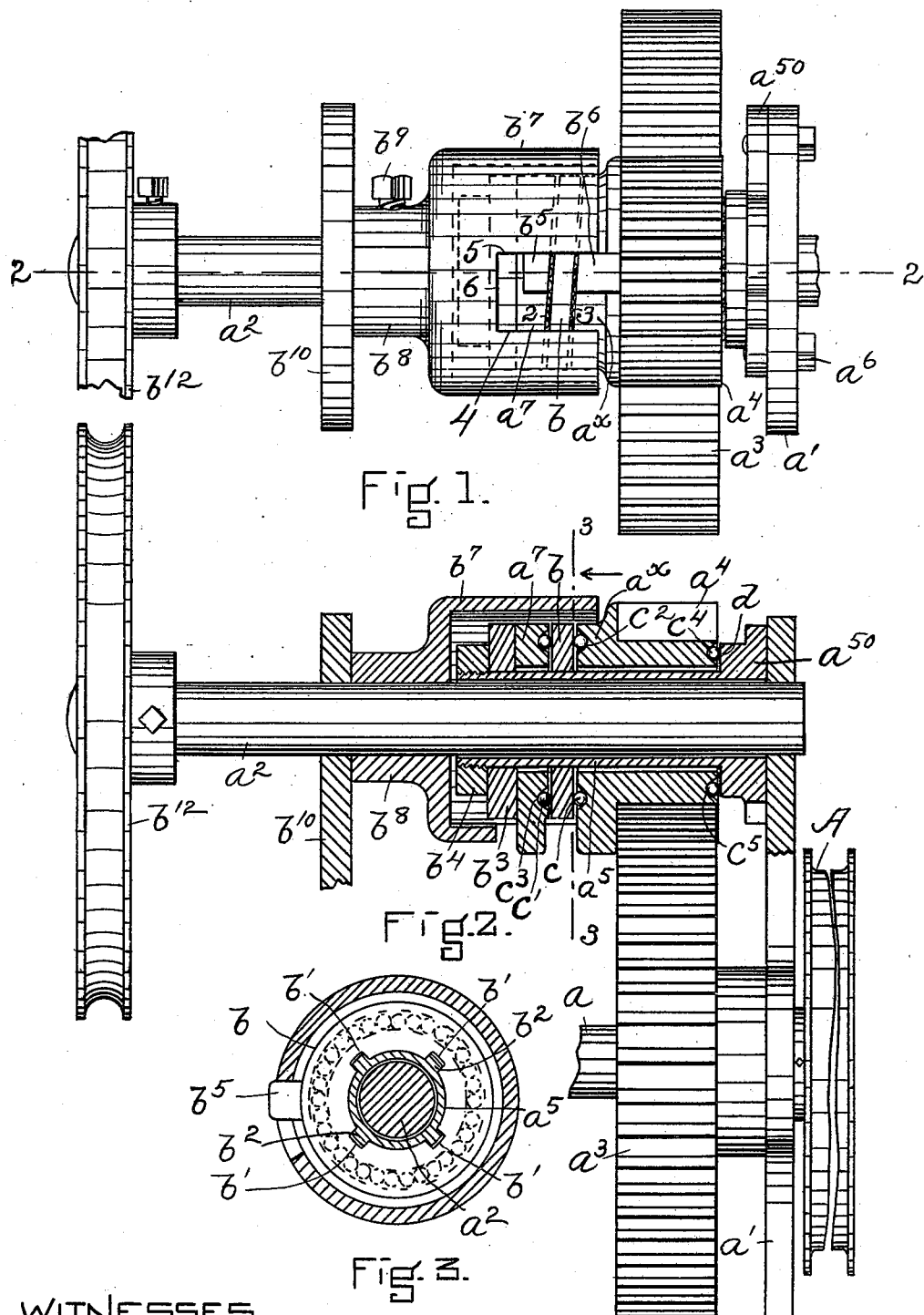

(No Model.) 2 Sheets—Sheet 2.

A. H. HOYT.
CLUTCH MECHANISM.

No. 598,932. Patented Feb. 15, 1898.

WITNESSES.
Matthew M. Blunt
J. C. Murphy

INVENTOR.
Albert H. Hoyt
by Jas. H. Churchill
ATT'Y.

UNITED STATES PATENT OFFICE.

ALBERT H. HOYT, OF EVERETT, MASSACHUSETTS, ASSIGNOR OF ONE-HALF TO SAMUEL C. ROWELL, OF BOSTON, MASSACHUSETTS.

CLUTCH MECHANISM.

SPECIFICATION forming part of Letters Patent No. 598,932, dated February 15, 1898.

Application filed January 16, 1897. Serial No. 619,399. (No model.)

*To all whom it may concern:*

Be it known that I, ALBERT H. HOYT, residing in Everett, in the county of Middlesex and State of Massachusetts, have invented an Improvement in Clutch Mechanism, of which the following description, in connection with the accompanying drawings, is a specification, like letters and figures on the drawings representing like parts.

This invention relates to clutch mechanisms of that class in which two movable or normally loose members having beveled inclined or cam-shaped adjacent faces are mounted on a stationary shaft or sleeve so as to turn thereon freely when moved in unison, but which when either is moved independent of the other are moved axially on the shaft or sleeve and become frictionally secured to the said stationary shaft or sleeve and rendered practically fast thereon by friction created between the opposite or remote ends of the loose members and parts fast on the said shaft.

Clutch mechanisms of the class referred to as now commonly constructed have interposed between them a ring or disk which permits one of the loose members to be moved independent of the other, and thereby effect the axial movement of both members along the shaft or sleeve until they are arrested in this axial movement by parts fast on the shaft, and further rotation of one of the normally loose members wedges the disk or ring between them. By turning either of the normally loose members in a reverse direction the disk or ring is released and the members of the clutch move toward each other, thereby releasing the said movable members from frictional engagement with the stationary shaft or sleeve and enabling the said members to turn freely upon the said shaft or sleeve.

My improvement is more particularly designed and adapted for use when the clutch mechanism of the class described is employed with or forms part of a hoisting or elevator apparatus, and is especially applicable for use on the freight-elevators in hotels, compartment houses, and like places, and also on dumb-waiters. Clutch mechanisms of the class referred to when used to control the operating mechanism of hand-operated elevators—such as the freight-elevators of compartment houses, dumb-waiters, &c.—possess the objectionable feature of being hard to work on the descent of the elevator-car, especially when loaded. This objectionable feature is due to the excessive friction between the parts of the clutch mechanism occasioned by the load carried and which friction is substantially proportionate to the load carried. The excessive friction referred to requires a heavy pull upon the operating or shipper rope to release the clutch, which produces an irregular and disagreeable motion to the elevator-car, besides rendering the elevator mechanism hard to operate.

In accordance with this invention I have overcome the objectionable feature of the clutch mechanism referred to and provided one which can be operated with substantially little power, and thereby avoid the irregular or jerking motion of the elevator-car on its descent, especially when loaded, by interposing between the adjacent faces of parts of the clutch antifriction balls or rolls, and leaving other adjacent faces of parts of the said clutch in contact with each other, so that a sufficient friction will be created between those faces in contact to insure the holding of the elevator when stopped at any point in its ascent or descent, while the friction between the balls or rollers and the other adjacent faces will be reduced to such extent as to insure the gradual release of the clutch, which will permit the elevator to be started with a minimum power and again stopped on its descent with a smooth and easy motion, especially when the elevator-car is loaded. These and other features of this invention will be pointed out in the claims at the end of this specification.

Figure 1 is a top or plan view of a sufficient portion of an elevator hoisting mechanism embodying this invention to enable it to be understood; Fig. 2, a section and elevation of the mechanism shown in Fig. 1, the section being taken on the line 2 2; Fig. 3, a cross-section on the line 3 3, Fig. 2, looking in the direction of the arrow thereon; Fig. 4, a section of a modification to be referred to; and Fig. 5, a section on the line 5 5, Fig. 4.

Referring to Fig. 2, A represents a drum or sheave, which may be supposed to be the hoisting-drum of an elevator mechanism, such as is used on freight-elevators in compartment houses and dumb-waiters in restaurants, hotels, and like places, the said drum in practice having passed about it the hoisting cable or rope. (Not herein shown, but which is connected to the elevator car or platform.)

The hoisting-drum A in the present instance is shown as mounted on a shaft $a$, having bearings in a suitable support $a'$. The shaft $a$ is adapted to be driven, as herein shown, from a main shaft $a^2$ by a gear $a^3$, fast on the shaft $a$, meshing with a pinion $a^4$, loosely mounted in the present instance on a sleeve $a^5$ and provided with a hub $a^\times$, the said sleeve being loosely fitted over the main shaft $a^2$ and having a head $a^{50}$, which is secured to the frame or support $a'$ by bolts $a^6$. The sleeve $a^5$ has also loosely fitted upon it a collar $a^7$, and the said collar and hub $a^\times$ of the pinion $a^4$ constitute the normally loose members of the clutch mechanism and are provided with cam-shaped or beveled faces 2 3, oppositely located, so that when one member is turned independent of the other and the higher parts of the cams or beveled faces 2 3 are engaged with each other the said members will be moved axially on the stationary sleeve $a^5$. Owing to the friction which would be created if the two faces 2 3 were permitted to come in contact with each other the movement of one member independent of the other would not take place, but both would turn together and thereby remain loose on the sleeve $a^5$.

To effect the independent movement referred to in clutch mechanisms of this class as now commonly constructed, a ring or disk $b$ is mounted on the sleeve $a^5$ intermediate of the loose members and with which the beveled or cam faces 2 3 make contact. The ring $b$ is free to tilt on the sleeve $a^5$, and consequently when one loose member is turned independently of the other loose member the said members are moved axially on the sleeve $a^5$ and the opposite or remote ends of the loose members are brought into engagement with friction surfaces or devices fast on the said sleeve, and in the construction herein shown the pinion $a^4$ engages the head $a^{50}$ of the sleeve $a^5$, while the member $a^7$ engages a washer $b^3$, which in turn is forced against a nut $b^4$ on the sleeve.

The construction described is very efficient as a clutch for holding the gear $a^3$ and shaft $a$ from rotating and therefore for holding the elevator car or platform at any desired point in its travel, and as the frictional engagement of the loose members of the clutch with the parts fast on the sleeve, which in the present instance are the head of the sleeve and the nut $b^4$, is proportional to the load on the car, which acts to turn the pinion $a^4$ through the shaft $a$ and gear $a^3$, it will be seen that the friction between the pinion $a^4$ and head $a^{50}$ of the sleeve $a^5$ at one end and between the washer $b^3$ and nut $b^4$ at the other end is substantially great or excessive and would require considerable power to turn the member $a^7$ in a reverse direction and bring its cam-surface 2 back into its normal position with relation to the surface 3 of the pinion $a^4$ and thereby release the clutch mechanism. The exercise of the power required to release the clutch mechanism causes the elevator car or platform to start in its descent with a sudden jar or vibratory movement, and to overcome this defect is the object of this invention, which I have accomplished by reducing the friction between the loose members of the clutch and preferably, also, between one of the loose members and the stationary part with which it is engaged in the clutch as now commonly constructed and as above described. In accordance with this invention the friction between the beveled or cam-shaped faces of the loose members may be reduced, as herein shown, by interposing between the ring $b$ and the pinion, hub, and collar $a^7$ antifriction balls or rolls $c$ $c'$, preferably confined in annular grooves $c^2$ $c^3$ in the said beveled faces, which grooves are preferably of a depth substantially equal to the diameter of the rolls or balls, so that the faces of the ring $b$ may be left smooth or flat, which construction is preferred on account of cheapness; but, if desired, the faces of the ring may be grooved also.

To still further reduce the friction, balls $c^4$ may be interposed between the hub of the pinion $a^4$ and the shoulder $d$ on the head $a^{50}$ of the sleeve $a^5$, the said balls being located in an annular groove $c^5$ in the said pinion, as herein shown. The friction required to securely hold the pinion $a^4$ from turning is obtained, as herein shown, by letting the collar $a^7$ make direct frictional contact with the washer $b^3$, and if it is desired to increase the said friction the balls $c^4$ may be omitted and the face of the hub permitted to make contact with the shoulder $d$ on the head $a^{50}$.

Figure 5:
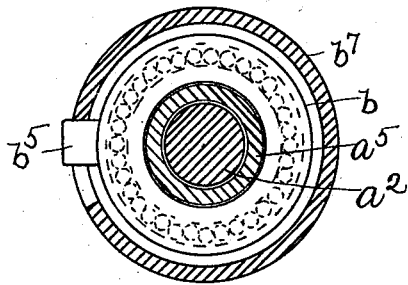

In the present instance the ring $b$ is shown in Fig. 3 as provided with a series of notches $b'$, which fit over a series of ribs or projections $b^2$ on the sleeve $a^5$; but the said ring may be loose on the sleeve and free to turn thereon, as shown in Figs. 4 and 5.

The beveled collar $a^7$ and the beveled hub $a^\times$ of the pinion $a^4$ are provided with radially-extended projections $b^5$ $b^6$, which extend into the path of movement of the side walls 4 5 of a slot 6 in an enlarged cylindrical flange $b^7$ on a hub $b^8$, fast on the shaft $a^2$, the said flange being extended over the pinion-hub $a^\times$, the ring $b$, the collar $a^7$, washer $b^3$, and nut $b^4$. The slotted cylindrical flange of the hub $b^8$ constitutes a releasing device or operating mechanism for the clutch.

The hub $b^8$ may be rendered fast on the shaft $a^2$ by a set-screw $b^9$ or in any other desired manner, and the said shaft may be supported in an upright $b^{10}$. The shaft $a^2$ is provided with a sheave or pulley $b^{12}$, about which is passed the usual hand-rope. (Not herein shown, but by means of which the shaft $a^2$ is rotated to elevate the car or platform.) When the lugs $b^5$ $b^6$ are in line with each other, as shown in Fig. 1, the beveled or inclined faces 2 3 have their highest points substantially opposite and the members of the clutch are loose on the sleeve, and consequently the pinion $a^4$ is free to be rotated on the sleeve $a^5$ by the operator turning the shaft $a^2$ by means of the hand-rope in such direction as will keep the wall 5 in engagement with the lugs $b^5$ $b^6$, and thereby turn the shaft $a$ in such direction as will wind the hoisting-rope upon the drum A, and consequently raise the elevator to the point desired. When the elevator has reached the point desired—as, for instance, a floor or landing in a compartment hotel—the operator releases the hand-rope, which action places the clutch under the control of the elevator-car, and the weight of the latter causes it to fall and rotate the pinion in a reverse direction, so that the lug $b^6$ is moved out of line with the lug $b^5$ and the loose members of the clutch are moved axially on the sleeve $a^5$ until the friction created between the said loose members and the fixed or stationary parts on the said sleeve is sufficient to hold the elevator suspended at the point desired.

To release the clutch and permit the elevator to be further raised or to permit it to descend, the operator turns the shaft $a^2$ by the hand-rope, so as to again bring the lugs $b^5$ $b^6$ in line with each other. By means of the antifriction devices between the loose members of the clutch I am enabled to reduce the friction to such extent that the ring $b$ may be dispensed with and the two loose members may make direct contact with antifriction balls or rolls interposed between them.

In my invention it will be noticed that friction is required between the loose members and a stationary part of the sleeve in order to obtain the proper holding effect, and consequently antifriction devices are not interposed between all of the surfaces, but only between some.

This construction of clutch mechanism insures the easy and gradual release of the clutch from its locked position without jar or vibration to the elevator-car and with a minimum expenditure of power on the part of the operator, thereby increasing the efficiency of this class of elevator service, especially in compartment houses, hotels, and in restaurants, &c., where dumb-elevators are used.

I claim—

1. In a clutch mechanism, the combination of the following instrumentalities, viz: two normally loose members having their adjacent faces beveled or cam-shaped and provided on their periphery with lugs or projections, a stationary sleeve or shaft upon which said loose members are mounted, frictional surfaces or stationary parts on the said shaft or sleeve with which said loose members are adapted to be engaged by the rotation of one of said members independent of the other, to lock the said loose members on the said sleeve or shaft, antifriction devices interposed between said normally loose members, and means fast on said shaft to engage the opposite sides of the lugs or projections of said normally loose members and effect their movement in unison in either direction around the said sleeve or shaft, substantially as described.

2. In a clutch mechanism, the combination of the following instrumentalities, viz: a stationary shaft or sleeve, two normally loose members having their adjacent faces cam-shaped or inclined and mounted on said shaft or sleeve and provided with radial projections, frictional surfaces or parts fast on said shaft or sleeve at opposite ends of the said loose members, a ring interposed between said movable members, antifriction devices interposed between said ring and the cam-shaped or inclined adjacent faces of the loose members, and means fast on said sleeve or shaft to engage said radial projections and render them free to be moved in unison about said sleeve or shaft, substantially as described.

3. In a clutch mechanism, the combination of the following instrumentalities, viz: a stationary shaft or sleeve, two normally loose members having their adjacent faces cam-shaped or inclined and mounted on said shaft or sleeve, frictional surfaces or parts fast on said shaft or sleeve at opposite ends of the said loose members, antifriction devices interposed between said normally loose members, antifriction devices interposed between one of said loose members and its coöperating frictional surface fast on the shaft or sleeve, and means to engage said movable members and effect their movement in unison around the said shaft or sleeve, substantially as described.

4. In a clutch mechanism, the combination of the following instrumentalities, viz: a shaft, two normally loose members having their adjacent faces beveled or inclined and in parallelism when said members are loose, radial projections on said members, stationary parts on said shaft with which said members are adapted to be engaged by the movement of one member independent of the other, antifriction devices interposed between the adjacent faces of the movable members, and a flanged hub fast on said shaft or sleeve and provided with a slot into which the radial projections on the loose members extend to be engaged by the walls of the said slot and move the loose members in unison about said shaft, substantially as described.

In testimony whereof I have signed my name to this specification in the presence of two subscribing witnesses.

ALBERT H. HOYT.

Witnesses:
JAS. H. CHURCHILL,
J. MURPHY.